United States Patent [19]

Doin et al.

[11] Patent Number: 4,783,347

[45] Date of Patent: Nov. 8, 1988

[54] METHOD FOR PRIMERLESS COATING OF PLASTICS

[75] Inventors: James E. Doin, Hoosick Falls; Howard A. Vaughn, Schenectady, both of N.Y.

[73] Assignee: General Electric Company, Waterford, N.Y.

[21] Appl. No.: 786,170

[22] Filed: Oct. 9, 1985

Related U.S. Application Data

[63] Continuation of Ser. No. 326,197, Dec. 1, 1981, abandoned.

[51] Int. Cl.$^4$ .................. B05D 3/02; B32B 27/08; B32B 27/36
[52] U.S. Cl. ........................... 427/379; 427/387; 427/393.5; 428/412; 428/447
[58] Field of Search .............. 428/412, 331, 336, 447; 106/287.12; 556/436; 427/387, 393.5, 316, 372, 379

[56] References Cited

U.S. PATENT DOCUMENTS

| | | | |
|---|---|---|---|
| 3,708,225 | 1/1973 | Misch et al. | 351/160 R |
| 3,976,497 | 8/1976 | Clark | 106/287.12 |
| 3,986,997 | 11/1976 | Clark | 260/29.2 M |
| 4,027,073 | 5/1977 | Clark | 428/412 |
| 4,159,206 | 6/1979 | Armbruster et al. | 106/287.12 |
| 4,177,315 | 12/1979 | Ubersax | 428/336 |
| 4,188,451 | 2/1980 | Humphrey, Jr. | 428/331 |
| 4,277,287 | 7/1981 | Frye | 106/287.12 |
| 4,278,804 | 7/1981 | Ashby et al. | 556/436 |

*Primary Examiner*—Thomas J. Herbert

[57] ABSTRACT

A method for securing protective silicone resin coatings to plastics without the use of primers is disclosed. Shock curing a silicone resin coating composition on transparent plastic substrates, such as polycarbonate, at a temperature not substantially below 140° C. is found to give a tough, adherent coating without distorting the substrate or diminishing its optical clarity, and without the use of primers. The suitability, after incorporation into the silicon resin coating composition, of certain sylilated ultraviolet light screening compounds for shock curing is also disclosed.

14 Claims, No Drawings

METHOD FOR PRIMERLESS COATING OF PLASTICS

This application is a continuation of application Ser. No. 326,197, filed Dec. 1, 1981, now abandoned.

This invention relates to a method for securing a protective coating to plastic substrates without the need for primers. More particularly, it relates to a silicone resin coating composition which, when shock cured on an unprimed substrate at high temperature, forms a protective, abrasion resistant coating thereon.

BACKGROUND OF THE INVENTION

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses in eye glasses and other optical instruments, as well as glazing for large buildings, also employ shatter-resistant, transparent plastics. The lighter weight of these plastics in comparison to glass is a further advantage, especially in the transportation industry where the weight of the vehicle is a major factor in its fuel economy.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated. Acrylics, such as polymethylmethacrylate, are also widely used transparent plastics for glazing.

Although these plastics provide the advantages of being more shatter-resistant and lighter than glass, they are more easily marred by contact with abrasives such as dust, cleaning equipment and ordinary weathering. This has led to the development of coatings which serve to improve the abrasion resistance of transparent plastics. For example, mar-resistant coatings formed from mixtures of silica, such as colloidal silica or silica gel, and hydrolyzable silanes in a hydrolysis medium, such as alcohol and water, are known. U.S. Pat. Nos. 3,708,225 (Misch, et al.); 3,976,497 (Clark), 3,986,997 (Clark); 4,027,073 (Clark); 4,159,206 (Armbruster, et al.) and 4,177,315 (Ubersax), for example, describe such compositions. Improved such compositions are also described in commonly assigned copending U.S. application Ser. No. 964,910, filed Nov. 30, 1978, now abandoned, and Frye, U.S. Pat. No. 4,277,287.

It has been discovered that such polysilicic acid coatings, especially if acidic, fail to adhere to certain plastic substrates, such as polycarbonate; and, even if prepared on the basic side of neutrality, they may adhere initially but peel after brief light aging. In copending application Ser. No. 91,716, now U.S. Pat. No. 4,299,746, the addition of an ultraviolet light absorbing compound, such as 2,4-dihydroxybenzophenone, is suggested, but in some cases this may have a plasticizing effect and polycarbonate seems to have a tendency to reject the coating on severe exposure. Another approach is to use a two-step system in which, for exmple, an acrylic primer is first applied which adheres to both the silicone resin coating and the polycarbonate substrate, and also serves as a binder for high levels of UV screens. The silicone resin coat is put on over the primer coat. See, for example, U.S. Pat. No. 4,188,451 (Humphrey, Jr.).

To avoid the need for a primer coat, commonly assigned copending U.S. application Ser. No. 34,164, filed Apr. 27, 1979, now U.S. Pat. No. 4,413,088 suggests replacing the usual alcohol solvents, e.g., isopropanol, with more aggressive solvents such as ketones, esters, nitroparrafins or the like. These solvents, however, are expensive and generally might require process modifications. Another approach to the elimination of primers is found in commonly assigned copending U.S. application Ser. No. 154,624, filed May 30, 1980, which discloses that incorporation of a silylated ultraviolet light screening compound into a silicone resin admits to primerless adhesion to plastics.

The above-mentioned patents and applications are incorporated herein by reference.

SUMMARY OF THE INVENTION

It has now been discovered that the need for primers can be avoided when applying a silicone resin coating to a plastic substrate if the coating composition is shock cured (i.e., cured at high temperature for a relatively short period) at a temperature not substantially below 140° C. This curing method not only saves the processing time and material expense of using primers, it reduces the normal curing time to as little as fifteen minutes or less. Also, coatings thus cured will exhibit excellent adhesion without primers and will retain their optical clarity. Furthermore, an even shorter period of high temperature cure at around 140° C. or above, following a period of moderate temperature cure, for example at 120° C., can promote the desired adhesion where protracted curing at only moderate temperatures would result in adhesion failure.

In another feature of this invention, it has been discovered that silicone resin coating compositions containing the silylated ultraviolet light screening compounds of the type disclosed in U.S. Pat. No. 4,278,804 (Ashby, et al.) and the aforementioned U.S. application Ser. No. 154,624, both incorporated herein by reference, also admit to primerless adhesion to plastics with shock curing. These UV screen-containing coatings exhibit excellent adhesion and abrasion resistance, as well as outstanding resistance to moisture, discoloration and delamination. Moreover, the silylated UV screens surprisingly do not volatilize at elevated temperatures but remain in the coating to impart their desirable properties.

Accordingly, it is the object of this invention to provide an improved method of securing silicone resin coatings to polycarbonate substrates without the use of primers.

It is a further object of this invention to provide a single-step method for securing silicone resin coatings to plastic substrates which reduces the necessary processing time and materials cost.

It is a further object of this invention to provide a silicone resin coating composition containing an ultraviolet light screening compound which is suitable for curing at high temperatures.

These and other objects are accomplished herein by a method of applying a silicone resin coating composition to an unprimed plastic substrate comprising:

(i) preparing a silicone resin coating composition comprising a dispersion of colloidal silica in an aliphatic alcohol-water solution of the partial condensate of a silanol of the formula $RSi(OH)_3$, wherein R is selected from the group onsisting of alkyl having 1 to 3 carbon atoms and aryl, wherein at least 70 weight percent of the silanol is $CH_3Si(OH)_3$, said resin containing 10 to 50 weight percent solids, said solids consisting of 10 to 70 weight percent colloidal silica and 30 to 90 weight percent of the partial condensate;

(ii) applying said resin to the unprimed plastic substrate; and (iii) curing said silicone resin coating composition on the substrate at a temperature not substantially below 140° C. for a period sufficient to promote adhesion of the silicone resin coating composition to the substrate, or, alternatively, partially curing the silicone resin coating composition on the substrate at temperatures below 140° C. and thereafter curing for at least 10 minutes at a temperature not substantially below 140° C.

In another feature of this invention, the above method will also include the steps, after step (i), of:

(i)(a) thoroughly admixing a small amount of a silylated ultraviolet light screening agent with said silicone resin coating composition; and (i)(b) allowing said admixture to age for a period of at least 2 hours.

DETAILED DESCRIPTION OF THE INVENTION

The silicone resin coating compositions used in this invention are prepared, e.g., by hydrolyzing a trialkoxysilane or a mixture of trialkoxsilanes of the formula $R'Si(OR)_3$, wherein $R'$ is alkyl of from 1 to 3 carbon atoms or aryl, such as phenyl, and R is alkyl, in an aqueous dispersion of colloidal silica.

In the practice of the present invention, suitable aqueous colloidal silica dispersions generally have a particle size of from 5 to 150 millimicrons in diameter. These silica dispersions are well known in the art, and commercially available examples include those sold under the trademarks "Ludox" ® (duPont) and "Nalcoag" ® (NALCO Chemical Co.). Such colloidal silicas are available as both acidic and basic hydrosols. For the purposes of this invention, basic colloidal silica sols are preferred, but acidic colloidal silicas are also contemplated. In addition, it has been found that colloidal silicas having a low alkali content (e.g., $Na_2O$) is preferred. Moreover, colloidal silica having an average particle size range of 10 to 30 millimicrons is also preferred. A particularly preferred dispersion for the purposes herein is Ludox LS ® (duPont).

In accordance with this invention, the aqueous colloidal silica dispersion is added to a solution of a small amount of alkyltriacetoxysilane or acetic acid in alkyltrialkoxysilane or aryltrialkoxysilane. The temperature of the reaction mixture is maintained at about 20° C. to 40° C., preferably below 25° C. It has been found that in about six to eight hours sufficient trialkoxysilane has reacted to reduce the initial two-phase liquid mixture to one liquid phase in which the now treated silica (i.e., treated by admixture with the trialkoxysilane) is dispersed. In general, the hydrolysis reaction is allowed to continue for a total of about 12 to 48 hours, depending upon the desired viscosity of the final product. The longer the hydrolysis reaction is permitted to continue, the higher will be the viscosity of the product.

After hydrolysis has been completed, the solids content is adjusted by the addition of alcohol, preferably isobutanol, to the reaction mixture. Other suitable alcohols for this purpose include other aliphatic alcohols such as methanol, ethanol, propanol, isopropanol, n-butyl alcohol, t-butyl alcohol, etc. Mixtures of such alcohols can be used as well.

The solvent system should contain from about 20 to 75 weight percent alcohol to ensure solution of the partial condensate (siloxanol). Optionally, additional water-miscible polar solvents, such as acetone, diacetone alcohol, butyl Cellosolve ® and the like in minor amounts, i.e., no more than 20 weight percent of the cosolvent system, may also be employed.

The solids content of the coating composition is generally preferred to be in the range from about 10 to 25 weight percent, most preferably about 13 to 20 weight percent, of the total composition.

In the most preferred features, and to improve the abrasion resistance of the coating, a thickening agent is added to the resin composition. The thickening agent may be added either during hydrolysis or after dilution with alcohol as described above. The addition of the thickening agent results in a higher viscosity fluid resin which permits a thicker wet film to be deposited on the substrate, which in turn results in a thicker cured film having increased abrasion resistance. Surprisingly, increasing the viscosity of the coating resins herein by the addition of a thickening agent does not result in a shortened shelf life of the composition as is found to occur when the viscosity is increased by simply raising the solids content of the composition.

Many thickening agents are suitable for the purposes herein. Hydroxypropyl guar gum and hydroxypropyl cellulose are preferred. Amounts contemplated are about 0.1 to about 1.0 weight percent, preferably about 0.1 to about 0.5 weight percent of the total composition.

In other features of this invention, a silylated ultraviolet light screening agent is added to the silicone resin coating composition. The silylated UV screens used in accordance with the present invention must be soluble in, and otherwise compatible with, the silicone resin hydrolyzate. A particularly preferred compound is 4-(3-triethoxysilylpropoxy)-2-hydroxybenzophenone. This compound is fully soluble in the silicone resin hydrolyzate, and furthermore is particularly effective in protecting polycarbonate from discoloration when the present coating compositions are applied to the surface thereof. Moreover, the presence of the UV screen does not detract from the otherwise excellent optical clarity of the silicone resin hydrolyzate.

The UV screens suitable for use in this invention can be made by following the teachings of U.S. Pat. No. 4,278,804 (Ashby, et al.), which is incorporated herein by reference.

Any amount of silylated UV screen which is effective to prevent discoloration of the substrate to which the composition will be applied can be used herein. In general, it has been found that best results are obtained if the UV screen is employed in amounts of from 8 to 16 weight percent of the total solids of the coating composition.

It has been found essential for primerless adhesion that, after thoroughly admixing the UV screen with the silicone resin hydrolyzate, the total admixture be allowed to age before use. By aging, it is meant standing at 10° C. or above, preferably at about room temperature, e.g., 18°-24° C., for at least 2 hours, but preferably for a minimum time of from about 5 to 10 days. While the nature of this aging process with respect to the compositions of the invention is not fully understood, it is believed that the UV screen is actually being chemically incorporated into the structure of the hydrolyzate.

In any event, it has been found that if the compositions of this invention are not properly aged after the addition of the UV screen, inferior adhesion of the coating to the unprimed substrate and poorer abrasion resistance may result.

The polysiloxane polyether copolymers disclosed in the aforementioned U.S. Pat. No. 4,277,287 (Frye) may optionally be added to the silicone resin compositions to act as flow control agents. Preferably, they are added to the composition after the initial solids content has been adjusted with alcohol. The polysiloxane polyether copolymers act as flow control agents and thereby prevent flowmarks, dirt marks, and the like on the surface of the substrate to which the coating is applied. For the purposes of this invention, a polysiloxane ether copolymer may be employed in an amount of from about 1.5 to about 15 weight percent of the total solids of the composition. At these amounts, the polysiloxane polyether copolymer prevents marks on the substrate which impair visibility or are esthetically detracting without significant deleterious effect on the otherwise good abrasion resistance, adhesion, ultraviolet light resistance, moisture resistance or humidity resistance of the coating. Moreover, the presence of the polysiloxane polyether copolymer additive is found to reduce the incidence of stress cracking in the hard coating.

The pH of the resin composition prior to addition of the UV screen preferably is in the range of from about 7.1 to about 7.8. If necessary, dilute base, such as sodium hydroxide, or weak acid, such as acetic acid may be added to the composition to adjust the pH to the desired range.

Testing has shown that the shock cure of this invention does not effectively promote adhesion where the coating compositions are of very acidic pH. Experiments involving silicone resin coating compositions prepared as described above and adjusted to several different pH levels with HCl showed that curing at 125° C. for an hour, then shock curing at 140° C. for 10–12 minutes, did not promote adhesion to polycarbonate for coatings at pH 3.0, 4.0, 5.0, and 6.0. Subsequent experiments revealed that a radical change in cure rate appeared evident at about pH 6.0–6.5. In view of these findings, coating compositions which are slightly basic, such as those described in the aforementioned U.S. application Ser. No. 964,910, are believed to be most suitable for the purposes of this invention and are therefore preferred. However, silicone resin coating compositions of acidic pH which are discovered to be suitable for the method disclosed herein are fully contemplated and intended to be covered by this invention.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic, and the like. Alkyltriacetoxysilanes wherein the alkyl group contains from 1–6 carbon atoms may be used, alkyl groups having from 1 to 3 carbon atoms being preferred.

The silanetriols, RSi(OH)$_3$, mentioned above, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which, upon hydrolysis, generate the silanetriol and further liberate the corresponding alcohol. In this way, at least a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of the silanetriols in the basic aqueous medium, condensation of the hydroxyl substituents to form

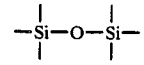

bonding occurs. This condensation takes place over a period of time and is not an exhaustive condensation but rather the siloxane retains an appreciable quantity of silicon-bonded hydroxyl groups which render the polymer soluble in the alcohol-water cosolvent. It is believed that this soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion or all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating, it is preferred to use all methyltrimethoxysilane (thus generating all monomethylsilanetriol) in preparing the coating compositions herein. In the preferred coating compositions herein, the partial condensate is present in an amount of from about 55 to 75 weight percent of the total solids in a cosolvent of alcohol and water, the alcohol comprising from about 50 to 95 weight percent of the cosolvent.

The silicone resin coating compositions used in the present invention can be applied to a variety of solid substrates by conventional methods, such as flow coating, spraying or dipping, to form a continuous surface film. Optimum coating thicknesses are obtained by slow-dip coating procedures.

Substrates which are especially contemplated herein are transparent, as well as non-transparent, plastics. More particularly, these plastics are synthetic organic polymeric substrates such as acrylic polymers like poly(methylmethacrylate), polyesters, such as poly-(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene and the like. The method of this invention is especially useful in coating polycarbonates, such as those polycarbonates known as Lexan ®, sold by General Electric Company, and in coating injection molded or extruded acrylics, such as polymethylmethacrylates.

After coating an unprimed substrate with the silicone resin composition described above, adhesion is promoted by heating the coated substrate at a temperature not substantially below 140° C., for a period sufficient to promoted adhesion of the coating to the substrate. Alternatively, curing at lower temperatures, for example 120° C. to 130° C., can be used intially, with high temperature cure at about 140° C. or above following. This two-phase cure has the advantage of minimizing the time that the coated substrate must be exposed to high temperatures, i.e., temperatures near the point at which the substrate would distort or warp. In any case, however, it has been observed that a minimum of 10 minutes at 140° C. following a minimum of 20 minutes at 120° C. is required to obtain adhesion of the silicone coating to clear polycarbonate substrates.

The exact temperature range suitable for shock curing varies with each different plastic substrate. The temperature must not be so high that warping or distortion of the plastic results. Polycarbonate, for example, is not usefully shock cured at temperatures nearing 150° C. for any but short periods, because it will start to appreciably lose dimensional integrity. Additionally, it has been found that when curing the thickened resin for more than five minutes at 150° C. or above leads to complete adhesion failure. Simple experimentation will yield the most suitable shock curing temperature range, in terms of appreciable distortion or coating adhesion loss, for other plastic substrates.

The duration of shock cure is likewise readily determined by simple experimentation. Simply varying the time of exposure until the desired adhesion is obtained will lead to the best exposure time for the particular substrate and coating composition employed.

For the feature of this invention which employs a silylated UV screen as an additive in the silicone resin composition, the period of shock cure will vary depending on the concentration of the UV screen. The higher the concentration of the UV screen, the longer will be the cure time required to promote good adhesion.

In order that those skilled in the art may better understand how to practice the present invention, the following examples are given by way of illustration and not by way of limitation.

EXAMPLES 1-4

22.1 parts by weight of Ludox LS ® silica sol (aqueous dispersion of colloidal silica, average particle size is 12 millimicrons, pH of 8.2 sold by DuPont) is added to a solution of 0.1 parts by weight of methyltriacetoxysilane in 26.8 parts by weight of methyltrimethoxysilane. The temperature of the reaction mixture is maintained at 25° C. The hydrolysis is allowed to continue for 16 hours. The solids content of the resultant reaction mixture is 40.5% and is diluted to about 20% solids with the addition of isopropanol, diacetone alcohol and isobutanol. 0.15 parts by weight of a thickener, hydroxypropyl cellulose, are added to the resin.

Two panels of unprimed, transparent Lexan ® polycarbonate are flow-coated with this silicone resin composition and labeled A and B. Panel A is cured at 120° C. for 30 minutes; panel B is cured at 140° C. for 15 minutes.

Adhesion of the silicone resin to the panels is tested by the scribed adhesion method, whereby a criss-cross pattern of 100-1 mm. by 1 mm. squares is scribed on the coated surface and tape is applied and pulled away. Three tape pulls without loss of adhesion is considered passing. Panel A shows adhesion failure, whereas panel B passes the scribed adhesion test.

In addition, panels prepared as panel A above (120° C. for 30 minutes) are exposed to 140° C. for 10 minutes and pass scribed adhesion tests. In tests to determine the minimum two-phase cure time, panels cured 20 minutes at 120° C., then 10 minutes at 140° C., pass the adhesion tests. Increasing the cure temperature from 120° C. to 150° C., however, causes distortion of the substrate after 5 minutes.

Panels coated with resin and cured at 150° C. for 5 minutes show complete adhesion loss.

EXAMPLES 5-7

22.1 parts by weight of Ludox LS ® silica sol (aqueous dispersion of colloidal silica, average particle size is 12 millimicrons, pH of 8.2 sold by duPont) are added to a solution of 0.1 parts by weight of methyltriacetoxysilane in 26.8 parts by weight of methyltrimethoxysilane. The temperature of the reaction mixture is maintained at 25° C. The hydrolysis is allowed to continue for 16 hours. The solids content of the resultant reaction mixture is 40.5% and is diluted to about 20% solids with the addition of isobutanol. The resulting resin is allowed to age at room temperature for at least 7 days before 4-(3-triethoxysilylpropoxy)-2-hydroxybenzophenone (SHBP) is added to portions of the resin at 8, 12, and 16 weight percent of solids. After stirring to dissolve the compound, the products are allowed to age for 48 hours.

Three unprimed Lexan ® panels are each flow-coated with a silicone resin containing a different concentration of SHBP, dried half an hour at room temperature, cured one hour at 140° C., and tested for abrasion resistance and resistance to weathering.

Abrasion resistance is tested by measuring the increase in haze ($\Delta$% H) after 500 cycles on a Taber Abraser using 500-gram load and CS-10F wheels. Resistance to weathering is tested on a QUV Accelerated Weathering Tester, which uses continuous alternating cycles of 8 hours ultraviolet radiation at 60° C. and 4 hours condensation at 50° C. Adhesion is tested periodically until it fails, the resistance then being recorded as the number of hours before adhesion failure. Curing in a range of 120° C. to 130° C. has consistently yielded a "QUV life" of less than 350 hours.

In the cases of the three panels described above, the following results were observed:

| Panel | Weight % SHBP | $\Delta$%H | QUV Life |
|---|---|---|---|
| 1 | 8 | 4.8 | failure at 835 hours |
| 2 | 12 | 4.25 | pass at 835 hours |
| 3 | 16 | 8.1 | pass at 835 hours |

This marked increase in the QUV life of silicone coatings after high temperature curing is a clear indication of the utility of the method of this invention.

Obviously, other modifications and variations of the present invention are possible in the light of the above teachings. It is to be understood, however, that changes made in the particular embodiments described above are within the full intended scope of the invention as defined in the appended claims.

We claim:

1. A method for adhering a silicone resin coating composition to an unprimed plastic substrate, comprising:
   (i) applying a silicone coating composition including colloidal silica having a pH basic of 6.5 to the substrate; and
   (ii) shock curing said silicone resin coating composition on the substrate at a temperature not substantially below 140° C. and up to 150° C. for at least about ten minutes to promote adhesion of the silicone resin coating composition to the substrate.

2. The method of claim 1, which includes after step (i), the additional steps:
   (i) (a) thoroughly admixing a small amount of silylated ultraviolet light screening agent in said silicone resin coating compoisition; and thereafter
   (i) (b) allowing the admixture to age for a period of at least 2 hours.

3. The method of claim 2, wherein said silylated ultraviolet light screening agent is 4-(3-triethoxysilylpropoxy)-2-hydroxybenzophenone.

4. A method for adhering a silicone resin coating composition to an unprimed plastic substrate, comprising:
   (i) applying a silicone resin coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, wherein at least 70 weight percent of the silanol is $CH_3Si(OH)_3$, said composition containing 10 to 50 weight percent solids, said solids consisting of 10 to 70 weight percent colloidal silica and 30 to 90 weight percent of the partial condensate, said composition further containing from 0.1 to 1.0 weight percent of a thickening agent, and said compositions having a pH of from 7.1 to 7.8, to the unprimed plastic substrate; and
   (ii) shock curing said silicone resin coating composition on the substrate at a temperature not substantially below 140° C. and up to 150° C. for at least about ten minutes to promote adhesion of the silicone resin coating composition to the substrate.

5. The method of claim 4, which includes the preliminary curing step of partially curing said silicone resin coating composition on said substrate at a temperature below 140° C.

6. The method of claim 4, wherein the thickening agent is hydroxypropyl guar gum.

7. The method of claim 4, wherein the thickening agent is hydroxypropyl cellulose.

8. The method of claim 4, wherein the aliphatic alcohol in step (i) is isobutanol.

9. The method of claim 4, wherein the partial condensate is $CH_3Si(OH)_3$.

10. The method of claim 4, which has the additional step, after step (i), of adding a small amount of a polysiloxane polyether copolymer sufficient to control flow.

11. A method for adhering a silicone resin coating composition to an unprimed plastic substrate, comprising:
    (i) applying a silicone resin coating composition including colloidal silica having a pH basic of 6.5 to the unprimed plastic substrate; and
    (ii) shock curing said silicone resin coating composition on said substrate at a high temperature not substantially below the warping temperature of said plastic substrate and up to 150° C. for at least about ten minutes to promote adhesion of the coating composition to the substrate.

12. The method of claim 11, which includes the preliminary curing step of partially curing said silicone resin coating composition on said substrate at an intermediate temperature, which is substantially below the warping temperature of said plastic substrate.

13. The method of claim 11, wherein said silicone resin coating composition comprises a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, wherein at least 70 weight percent of the silanol is $CH_3Si(OH)_3$, said composition containing 10 to 50 weight percent solids, said solids consisting of 10 to 70 weight percent colloidal silica and 30 to 90 weight percent of the partial condensate, said composition further containing from 0.1 to 1.0 weight percent of a thickening agent, said composition having a pH of from 7.1 to 7.8.

14. The method of claim 13, wherein said silicone resin coating composition additionally contains a silylated ultraviolet light screening agent.

* * * * *